(12) United States Patent
Huang et al.

(10) Patent No.: US 11,899,689 B2
(45) Date of Patent: Feb. 13, 2024

(54) BLOCKCHAIN-BASED DATA SYNCHRONIZATION METHOD, APPARATUS, AND COMPUTER-READABLE STORAGE MEDIUM

(71) Applicant: TENCENT TECHNOLOGY (SHENZHEN) COMPANY LIMITED, Shenzhen (CN)

(72) Inventors: Huankun Huang, Shenzhen (CN); Zongyou Wang, Shenzhen (CN); Pan Liu, Shenzhen (CN); Jinsong Zhang, Shenzhen (CN); Gengliang Zhu, Shenzhen (CN); Yifang Shi, Shenzhen (CN); Zhiyong Liao, Shenzhen (CN); Kaiban Zhou, Shenzhen (CN); Qucheng Liu, Shenzhen (CN); Changqing Yang, Shenzhen (CN); Hu Lan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 66 days.

(21) Appl. No.: 17/719,293

(22) Filed: Apr. 12, 2022

(65) Prior Publication Data
US 2022/0245173 A1    Aug. 4, 2022

Related U.S. Application Data

(63) Continuation of application No. PCT/CN2021/074977, filed on Feb. 3, 2021.

(30) Foreign Application Priority Data

Apr. 9, 2020    (CN) .......................... 202010274759.4

(51) Int. Cl.
*G06F 16/00* (2019.01)
*G06F 16/27* (2019.01)

(52) U.S. Cl.
CPC ................................. *G06F 16/275* (2019.01)

(58) Field of Classification Search
CPC ........................... G06F 16/275; G06F 16/9024
See application file for complete search history.

(56) References Cited

U.S. PATENT DOCUMENTS 6,976,209 B1 *  12/2005  Storisteanu ........... G06F 40/169
                                                        715/201
10,949,447 B2 *  3/2021  Wang .................. H04L 67/1095
(Continued)

FOREIGN PATENT DOCUMENTS

CN    107124457 A    9/2017
CN    108600353 A    9/2018
(Continued)

OTHER PUBLICATIONS

The State Intellectual Property Office of the People's Republic of China (SIPO) Office Action 1 for for 202010274759.4 dated May 28, 2021 13 Pages (including translation).
(Continued)

*Primary Examiner* — Noosha Arjomandi
(74) *Attorney, Agent, or Firm* — ANOVA LAW GROUP PLLC (57) ABSTRACT

A blockchain-based data synchronization method, executed by a first service node, includes: acquiring target block data having a minimum block height that is greater than a first local block height, the first local block height being a maximum block height of local block data of the first service node before the first service node acquires the target block data; determining a block height of missing block data according to a block height of the target block data and the (Continued)

first local block height, the block height of the missing block data being less than the minimum block height of the target block block data and greater than the first local block height; and requesting a target service node to synchronize the missing block data according to the block height of the missing block data.

20 Claims, 8 Drawing Sheets

(56) References Cited

U.S. PATENT DOCUMENTS

| | | | |
|---|---|---|---|
| 11,265,322 B2 | 3/2022 | Shen et al. | |
| 11,652,604 B2* | 5/2023 | Gundavelli | H04L 9/0618 |
| | | | 380/37 |
| 2018/0039667 A1* | 2/2018 | Pierce | H04L 9/3247 |
| 2019/0132350 A1* | 5/2019 | Smith | G06F 21/577 |
| 2019/0158594 A1* | 5/2019 | Shadmon | H04L 67/01 |
| 2019/0236606 A1* | 8/2019 | Padmanabhan | H04L 9/3239 |
| 2019/0327299 A1* | 10/2019 | Diamanti | H04L 9/50 |
| 2020/0067697 A1* | 2/2020 | Puddu | G06Q 20/3827 |
| 2020/0110813 A1* | 4/2020 | Kamijoh | G06F 16/1805 |
| 2020/0167345 A1* | 5/2020 | Zhuo | G06Q 20/388 |
| 2020/0242592 A1* | 7/2020 | Scrivner | G06Q 20/3672 |
| 2020/0252406 A1* | 8/2020 | Padmanabhan | H04L 9/0891 |
| 2020/0349502 A1* | 11/2020 | Govekar | G06Q 10/0832 |
| 2021/0004297 A1* | 1/2021 | Scrivner | G06F 11/1451 |
| 2021/0073212 A1* | 3/2021 | Conley | H04L 9/3213 |
| 2021/0135847 A1* | 5/2021 | Manevich | H04L 9/3239 |
| 2021/0141804 A1* | 5/2021 | Liu | G06F 16/27 |
| 2021/0141909 A1* | 5/2021 | Zhai | H04L 9/3239 |
| 2021/0240498 A1* | 8/2021 | Padmanabhan | G06F 16/2246 |
| 2021/0357369 A1* | 11/2021 | Kwon | H04L 9/3239 |
| 2022/0101430 A1* | 3/2022 | Barton | G06Q 40/04 |
| 2022/0114276 A1* | 4/2022 | Sachsenhauser | H04L 43/0876 |
| 2022/0245173 A1* | 8/2022 | Huang | G06F 16/275 |
| 2022/0272085 A1* | 8/2022 | Novotny | H04L 63/126 |
| 2022/0303121 A1* | 9/2022 | Manevich | H04L 9/14 |
| 2022/0329411 A1* | 10/2022 | Kodeswaran | H04L 9/0643 |

FOREIGN PATENT DOCUMENTS

| | | |
|---|---|---|
| CN | 108984662 A | 12/2018 |
| CN | 109165229 A | 1/2019 |
| CN | 109446273 A | 3/2019 |
| CN | 109714412 A | 5/2019 |
| CN | 110473104 A | 11/2019 |
| CN | 110609872 A | 12/2019 |
| CN | 110798509 A | 2/2020 |
| CN | 110889729 A | 3/2020 |
| CN | 111475575 A | 7/2020 |
| KR | 20180086679 A | 8/2018 |
| WO | 2019101246 A3 | 1/2020 |

OTHER PUBLICATIONS

The World Intellectual Property Organization (WIPO) International Search Report for PCT/CN2021/074977 dated Apr. 29, 2021 6 Pages (including translation).

Qi-Feng Shao et al., "Blockchain: Architecture and Research Progress," Chinese Journal of Computers, vol. 41 Issue 5, May 31, 2018 (May 31, 2018). 21 pages.

* cited by examiner

BLOCKCHAIN-BASED DATA SYNCHRONIZATION METHOD, APPARATUS, AND COMPUTER-READABLE STORAGE MEDIUM

CROSS-REFERENCES TO RELATED APPLICATIONS

This application is a continuation application of PCT Patent Application No. PCT/CN2021/074977, entitled "BLOCKCHAIN-BASED DATA SYNCHRONIZATION METHOD AND APPARATUS, AND COMPUTER-READABLE STORAGE MEDIUM" and filed on Feb. 3, 2021, which claims priority to Chinese Patent Application No. 202010274759.4, entitled "Blockchain-based data synchronization method, apparatus, and computer-readable storage medium" and filed on Apr. 9, 2020, the entire contents of both of which are incorporated herein by reference.

FIELD OF THE TECHNOLOGY

The present disclosure relates to the field of data processing technologies, and in particular, to a blockchain-based data synchronization technology.

BACKGROUND OF THE DISCLOSURE

With the continuous development of blockchain technologies, more and more things can be executed through blockchain networks. A blockchain network may include a plurality of service nodes. The service nodes are connected to each other, and the service nodes can pull block data from each other (where the block data may be block header data).

In related technologies, when a service node pulls block data from other service nodes, if some of the block data is not obtained by pulling, the service node needs to resynchronize all the block data with the other service nodes. Since the data volume of all the block data is often relatively large, resynchronizing all the block data will result in low efficiency of pulling block data.

SUMMARY

The present disclosure provides a blockchain-based data synchronization method, apparatus, and computer-readable storage medium, which can improve the synchronization efficiency of missing block data.

One aspect of the present disclosure provides a blockchain-based data synchronization method, executed by a first service node, the method including: acquiring target block data having a minimum block height that is greater than a first local block height, the first local block height being a maximum block height of local block data of the first service node before the first service node acquires the target block data; determining a block height of missing block data according to a block height of the target block data and the first local block height, the block height of the missing block data being less than the minimum block height of the target block data and greater than the first local block height; and requesting a target service node to synchronize the missing block data according to the block height of the missing block data.

One aspect of the present disclosure provides a blockchain-based data synchronization apparatus, applicable to a first service node, the apparatus including: a data acquisition module, configured to acquire target block data having a minimum block height that is greater than a first local block height, the first local block height being a maximum block height of local block data of the first service node before the first service node acquires the target block data;; a height determining module, configured to determine a block height of missing block data according to a block height of the target block data and the first local block height, the block height of the missing block data being less than the minimum block height of the target block data and greater than the first local block height; and a synchronization module, configured to request a target service node to synchronize the missing block data according to the block height of the missing block data.

One aspect of the present disclosure provides a computer device of a first service node in a blockchain, including a memory and a processor, the memory storing a computer program. The processor, when executing the computer program, is configured to perform: acquiring target block data having a minimum block height that is greater than a first local block height, the first local block height being a maximum block height of local block data of the first service node before the first service node acquires the target block data; determining a block height of missing block data according to a block height of the target block data and the first local block height, the block height of the missing block data being less than the minimum block height of the target block data and greater than the first local block height; and requesting a target service node to synchronize the missing block data according to the block height of the missing block data.

One aspect of the present disclosure provides a non-transitory computer-readable storage medium, storing a computer program, the computer program including program instructions, the program instructions, when executed by a processor of a first service node in a blockchain, causing the processor to execute the method according to the above aspect of the present disclosure.

In the present disclosure, during block data pulling, target block data may be acquired according to a first local block height, the first local block height being a maximum block height of local block data before the first service node acquires the target block data, and a minimum block height of the target block data being greater than the first local block height. If block data is missing during pulling, the minimum block height of the target block data and the first local block height will be discontinuous, rather than continuous. Therefore, a block height of missing block data may be determined according to a block height of the target block data and the first local block height, the block height of the missing block data being less than the minimum block height of the target block data and greater than the first local block height. Then, a target service node is requested to synchronize the missing block data according to the block height of the missing block data. It can be seen that the method proposed in the present disclosure can obtain the block height of the missing block data according to the block heights in the target block data and the first local block height and then can quickly synchronize the missing block data according to the block height of the missing block data, without needing to resynchronize all the block data, thereby improving the synchronization efficiency of missing block data.

BRIEF DESCRIPTION OF THE DRAWINGS

To describe the technical solutions of the present disclosure or the related technology more clearly, the following briefly introduces the accompanying drawings required for describing the embodiments or the related technology. The accompanying drawings in the following description show some embodiments of the present disclosure, and a person skilled in the art may still derive other drawings from these accompanying drawings without creative efforts.

DESCRIPTION OF EMBODIMENTS

The technical solutions of the present disclosure are clearly and completely described below with reference to the accompanying drawings of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

A blockchain is a new application mode of computer technologies such as distributed data storage, point-to-point transmission, a consensus mechanism, and an encryption algorithm. The blockchain is essentially a decentralized database and a series of associated data blocks generated in a cryptographic manner. Each data block includes information about a batch of network transactions for verifying the validity of the information (for anti-counterfeiting) and generating a next block. The blockchain may include an underlying blockchain platform, a platform product service layer, and application service layer. The blockchain includes a series of blocks that are consecutive in a chronological order of generation. Once a new block is added to the blockchain, the new block is no longer removed. The block records recorded data submitted by the node in the blockchain system.

Figure 1:
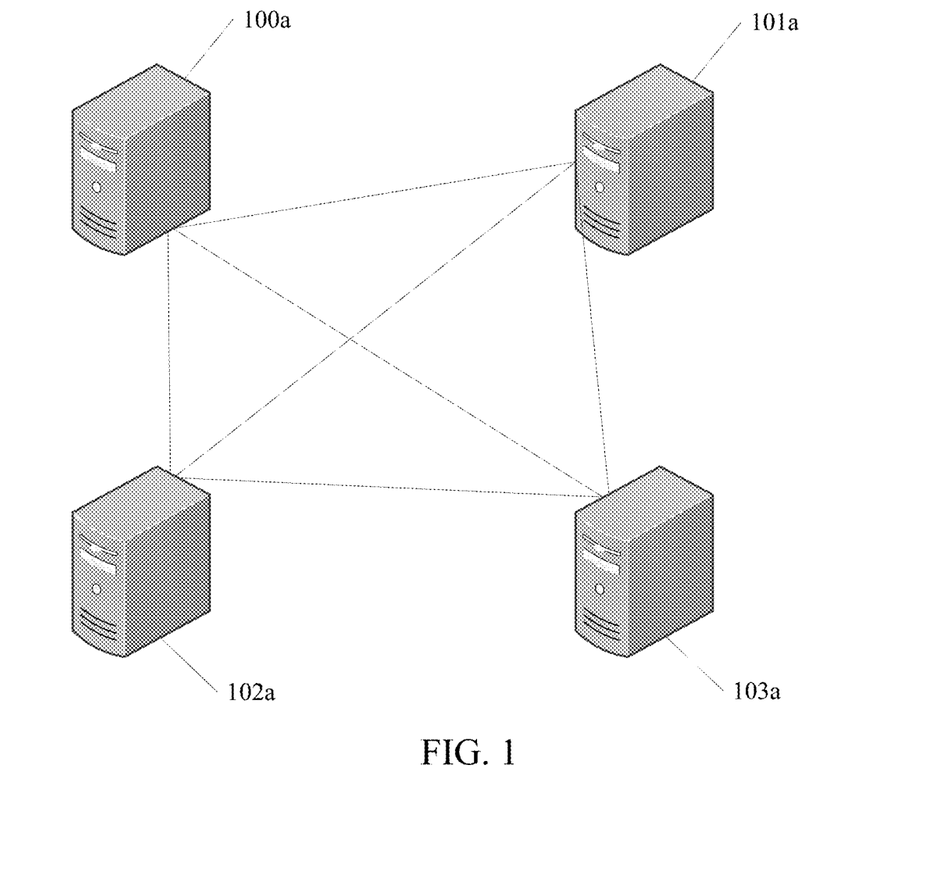
FIG. 1 is a schematic diagram of a system architecture according to an embodiment of the present disclosure.

Referring to FIG. 1, FIG. 1 is a schematic diagram of a system architecture according to an embodiment of the present disclosure. As shown in FIG. 1, the system architecture includes a plurality of service nodes. The plurality of service nodes are all blockchain nodes in a blockchain network. The plurality of service nodes specifically include service node 100a, service node 101a, service node 102a, and service node 103a. One service node may be composed of one server or a plurality of servers. The number of servers that constitute a service node is determined depending on actual application scenarios, which is not limited herein. The service node 100a, the service node 101a, the service node 102a, and the service node 103a are connected to each other. The service node 100a, the service node 101a, the service node 102a, and the service node 103a can pull block data from each other. The block data may be block header data. The embodiments of the present disclosure will be described in detail by taking a process of pulling block data from other service nodes by the service node 100a as an example.

Figure 2:
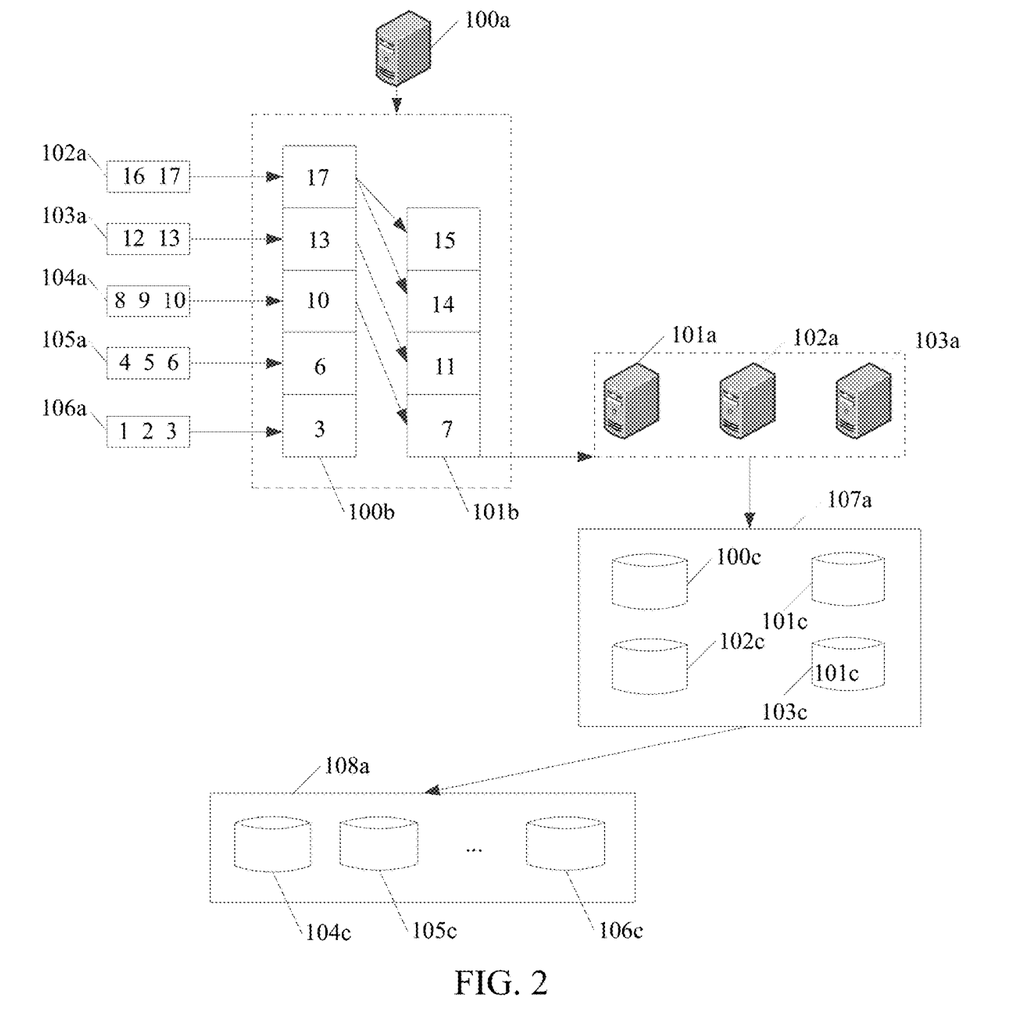
FIG. 2 is a schematic diagram of a data pulling scenario according to an embodiment of the present disclosure.

Referring to FIG. 2, FIG. 2 is a schematic diagram of a data pulling scenario according to an embodiment of the present disclosure. As shown in FIG. 2, two queues, namely, queue 100b and queue 101b, may be maintained in the service node 100a. The queue 100b includes a maximum block height of block data pulled by the service node 100a from other service nodes (which may be the service node 101a, the service node 102a, or the service node 103a) in each block data pulling. The queue 100b includes a block height of missing block data each time the service node 100a pulls block data from other service nodes.

Usually, block data pulled by a service node each time is block data with continuous block heights. As shown in FIG. 2, when the service node 100a pulls block data 106a (including block data with a block height of 1, block data with a block height of 2, and block data with a block height of 3) from another service node in a first pulling process, a maximum block height of the block data 106a pulled this time is 3. Therefore, the service node 100a can add the maximum block height of 3 to the queue 100b.

Afterward, when the service node 100a pulls block data 105a (including block data with a block height of 4, block data with a block height of 5, and block data with a block height of 6) from another service nodes in a second pulling process, a maximum block height and a minimum block height of the block data 105a pulled this time are respectively 6 and 4. Therefore, the service node 100a can add the maximum block height of 6 to the queue 100b. Because the maximum block height in the queue 100b is 3 before the maximum block height of 6 is added to the queue 100b, there is no interruption (that is, no block height is jumped) between the maximum block height of 3 and the minimum block height of 4 in the block data 105a pulled in the second pulling process, indicating that no block data is missing in the block data pulled in the second pulling process, that is, there is no missing block data. Therefore, after the second pulling process, no block height will be added to the queue 101b.

When the service node 100a pulls block data 104a (including block data with a block height of 8, block data with a block height of 9, and block data with a block height of 10) from another service nodes in a third pulling process, a maximum block height and a minimum block height of the block data 104a pulled this time are respectively 10 and 8. Therefore, the service node 100a can add the maximum block height of 10 to the queue 100b. Because the maximum block height in the queue 100b is 6 before the maximum block height of 10 is added to the queue 100b, there is an interruption (that is, a block height of 7 is jumped) between the maximum block height of 6 and the minimum block height of 8 in the block data 104a pulled in the third pulling process, indicating that some block data is missing in the block data pulled in the third pulling process, that is, there is missing block data. The missing block data is block data with a block height of 7. Therefore, after the third pulling process, the service node 100a can add the block height of 7 to the queue 101b.

When the service node 100a pulls block data 103a (including block data with a block height of 12 and block data with a block height of 13) from another service nodes in a fourth pulling process, a maximum block height and a minimum block height of the block data 103a pulled this time are respectively 13 and 12. Therefore, the service node 100a can add the maximum block height of 13 to the queue 100b. Because the maximum block height in the queue 100b is 10 before the maximum block height of 13 is added to the queue 100b, there is an interruption (that is, a block height of 11 is jumped) between the maximum block height of 10 and the minimum block height of 12 in the block data 103a pulled in the fourth pulling process, indicating that some block data is missing in the block data pulled in the fourth pulling process, that is, there is missing block data. The missing block data is block data with a block height of 11. Therefore, after the fourth pulling process, the service node 100a can add the block height of 11 to the queue 101b.

When the service node 100a pulls block data 102a (including block data with a block height of 16 and block data with a block height of 17) from another service nodes in a fifth pulling process, a maximum block height and a minimum block height of the block data 102a pulled this time are respectively 17 and 16. Therefore, the service node 100a can add the maximum block height of 17 to the queue 100b. Because the maximum block height in the queue 100b is 13 before the maximum block height of 17 is added to the queue 100b, there is an interruption (that is, a block height of 14 and a block height of 15 are jumped) between the maximum block height of 13 and the minimum block height of 16 in the block data 102a pulled in the fifth pulling process, indicating that some block data is missing in the block data pulled in the fifth pulling process, that is, there is missing block data. The missing block data is block data with a block height of 14 and block data with a block height of 15. Therefore, after the fifth pulling process, the service node 100a can add the block height of 14 and the block height of 15 to the queue 101b.

Through the above process, it can be understood that each time the service node 100a pulls new block data from another service node, the service node 100a adds a maximum block height in the pulled block data to the queue 100b, finds a block height of missing block data according to the maximum block height in the queue 100b and the minimum block height of the pulled block data, and adds the block height of the missing block data to the queue 101b. Subsequently, the service node 100a can pull block data corresponding to the block height from another service node (which may be the service node 101a, the service node 102a, or the service node 103a) according to the block height recorded in the queue 101b. To be specific, the service node 100a pulls block data 107a (including block data 100c with a block height of 7, block data 101c with a block height of 11, and block data 102c with a block height of 14, and block data 103c with a block height of 15) from another service node, to realize quick synchronization of the block data that is missing in the previous block data pulling process. After quickly synchronizing the missing block data (including the block data 100c with a block height of 7, the block data 101c with a block height of 11, the block data 102c with a block height of 14, and the block data 103c with a block height of 15) according to the above queue 101b, the service node 100a holds current complete block data, which includes 17 consecutive pieces of block data including block data with a block height of 1, block data with a block height of 2, . . . , and block data with a block height of 17. Moreover, when synchronizing the missing block data according to the queue 101b, the service node 100a may further continue to pull new block data 108a (for example, block data 104c with a block height of 18, block data 105c with a block height of 19, . . . , and block data 106c) from another service node.

Similarly, each service node in the blockchain network (including the service node 100a, the service node 101a, the service node 102a, and the service node 103a) can maintain two queues of the same types as the above queue 100b and queue 101b, and each service node can quickly synchronize missing block data according to the two queues maintained by itself The process of synchronizing missing block data by each service node is the same as the process of synchronizing missing block data by the service node 100a.

With the method provided in the present disclosure, two queues can be maintained in a service node, so that missing block data of the service node can be quickly synchronized according to the two queues, thereby improving the efficiency of pulling missing block data. Moreover, because the two queues are maintained, the process of synchronizing missing block data does not affect the pulling of other new block data by the service node.

Figure 3:
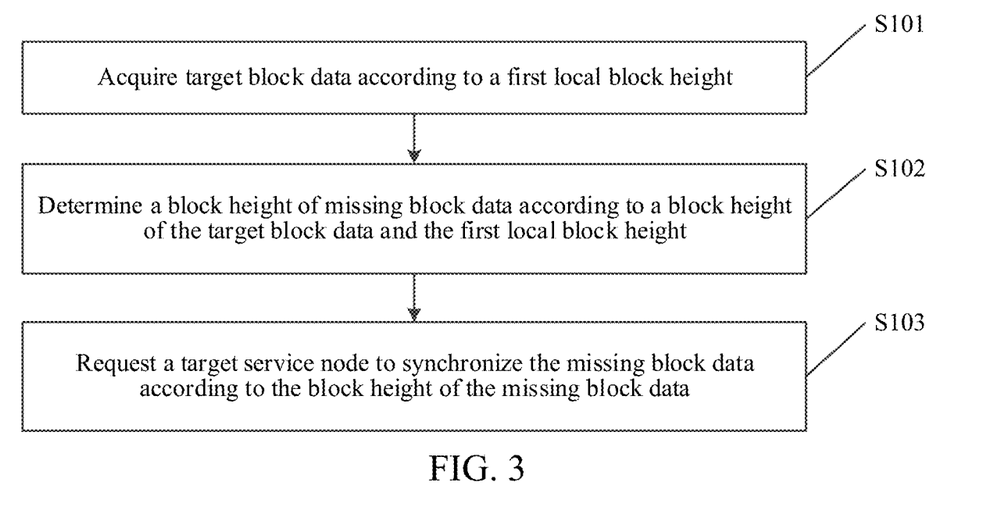
FIG. 3 is a schematic flowchart of a blockchain-based data synchronization method according to an embodiment of the present disclosure.

Referring to FIG. 3, FIG. 3 is a schematic flowchart of a blockchain-based data synchronization method according to an embodiment of the present disclosure. As shown in FIG. 3, the method may include the following steps:

Step S101: Acquire target block data according to a first local block height.

The target block data has a minimum block height that is greater than a first local block height. The first local block height may be a maximum block height of local block data before the first service node acquires the target block data.

It can be understood that any service node of a plurality of service nodes can execute the data synchronization method. Therefore, this embodiment is described using an example where the execution entity is one of the service nodes, e.g., the first service node. The first service node may be any blockchain node in a blockchain network. For example, the first service node may be any lightweight node (i.e., spy node) in the blockchain network, or may be any consensus node in the blockchain network, or may be any blockchain node other than consensus nodes in the blockchain network. The first service node is a computer device, and the computer device may be a server, a terminal device, etc. In other words, a blockchain node in the blockchain network may be a server, a terminal device, etc. The number of servers or terminal devices corresponding to one blockchain node is determined depending on actual application scenarios, which is not limited herein.

The first service node may maintain a maximum block height queue. The maximum block height queue is configured to store maximum block heights of block data pulled by the first service node from another service node in block data pulling operations. At a certain time point, a block height with a largest value in the maximum block height queue is a maximum block height of block data pulled by the first service node at this time point. For example, if the block height with the largest value in the maximum block height queue is 100, it means that theoretically, the first service node has now pulled a total of 100 pieces of block data respectively with block heights from 1 to 100 (in an actual scenario of this case, some block data may be missing during pulling; for example, if the first service node has not pulled block data with a block height of 50, the missing block data is block data with a block height of 50). The block data may include a block header in a block. The block data may further include hash values of service data in the block (or hash values of some service data, where for example, the block data pulled by the first service node may include the block header in the block and hash values of service data in the block that does not belong to the first service node).

In addition to the first service node, the blockchain network may further include other service nodes. The service nodes in the blockchain network may broadcast their own local block heights to each other based on a certain broadcast period (for example, every 30 minutes, every 1 hour, etc.). The local block height refers to a maximum block height in all block data stored in the service node at a certain time point. Therefore, the first service node can also know the local block heights of other service nodes in the blockchain network. In this embodiment, the local block height of the first service node may be referred to as the first local block height, so the first local block height is the block height with the largest value in the maximum block height queue of the first service node. The first service node may compare an obtained local block height of another service node with the first local block height, and when the result of comparison shows that the local block height of the another service node is greater than the first local block height, the first service node may pull new block data from the another service node.

For example, the first service node may obtain a local block height broadcast by a second service node (which may be any service node in the blockchain network other than the first service node). The second service node may periodically broadcast its local block height to the first service node according to a broadcast period (for example, 1 minute, 1 hour, or 1 day, etc.). In this embodiment, the local block height of the second service node may be referred to as a second local block height. If the first service node detects that the second local block height is greater than the first local block height, the first service node may pull new block data, that is, target block data, from another service node (for example, the second service node) according to the first local block height and the second local block height. For example, when the first local block height is 5 and the second local block height is 10, the first service node may pull block data with block heights of 6 to 10 from another service node, that is, pull block data with a block height of 6, block data with a block height of 7, block data with a block height of 8, block data with a block height of 9, and block data with a block height of 10. New block data pulled by the first service node may be referred to as target service data. However, when the first service node pulls new block data from another service node, some block data may fail to be pulled. The block data that fails to be pulled is missing block data of the first service node. For example, similarly, when the first local block height is 5 the second local block height is 10, and the first service node pulls new block data from another service node, the first service node may only successfully pull block data with a block height of 8, block data with a block height of 9, and block data with a block height of 10, but fail to pull block data with a block height of 6 and block data with a block height of 7. In this case, the block data with a block height of 8, the block data with a block height of 9, and the block data with a block height of 10 that are successfully pulled may be referred to as target service data, and the block data with a block height of 6 and the block data with a block height of 7 that fail to be pulled may be referred to as missing block data.

On the other hand, the first service node may also broadcast its own local block height (that is, the first local block height) to other service nodes. For example, the first service node may broadcast the first local block height to the second service node according to a broadcast period, so that in response to detecting that the first local block height is greater than the second local block height, the second service node may pull block data that it does not have from another service node (for example, the first business node) according to the first local block height and the second local block height. In some embodiments, the second service node may choose to pull new block data from a third service node, where the third service node may be a service node with a highest service quality score in the blockchain network. The service quality score of each service node may be determined based on an amount of block data pulled by the each service node in a unit time. A larger amount of block data pulled by a service node in a unit time indicates that a higher service quality score of this service node.

Similarly, the above target block data is also new block data pulled by the first service node, and the target block data may be one or more pieces of block data. Therefore, the first service node may further add the maximum block height in the target service data to the maximum block height queue. At this time, the block height with the largest value in the maximum block height queue of the first service node becomes the maximum block height of the target block data.

Step S102: Determine a block height of missing block data according to a block height of the target block data and the first local block height, the block height of the missing block data being less than the minimum block height of the target block data and greater than the first local block height.

The first local block height is a maximum block height in all block data acquired by the first service node before acquiring the target block data, that is, the block height with the largest value in the maximum block height queue before acquiring the target block data. The first service node may determine the block height of the missing block data according to the block height of the target block data and the first local block height. As exemplified above in step S102, the missing block data is block data that is missing when the first service node pulls new block data. Therefore, it may be understood that the block height of the missing block data is less than the minimum block height of the target block data and the block height of the missing block data is greater than the first local block height. For example, if the minimum block height of the target block data is 10 and the first local block height is 8, the block height of the missing block data is a block height of less than 10 and greater than 8, i.e., 9.

Step S103: Request a target service node to synchronize the missing block data according to the block height of the missing block data.

The first service node may record the block height of the missing block data. Subsequently, the first service node may synchronize (i.e., pull) the missing block data from the target service node according to the recorded block height of the missing block data. The first service node may detect the service quality score of each service node in a service node cluster (that is, a cluster formed by the service nodes in the blockchain network), and determine the detected service node with the highest service quality score (i.e., whose service quality score is the highest) as the target service node. The service quality score of each service node may be determined based on an amount of block data pulled by the each service node in a unit time. A larger amount of block data pulled by a service node in a unit time indicates that a higher service quality score of this service node. In some embodiments, the target service node may also be any service node in the service node cluster.

The first service node may further add the block height of the missing block data into a missing block queue, to store and manage the block height of the missing block data in the form of a queue. Subsequently, the first service node may request the target service node to synchronize the missing block data according to the missing block queue. By the method provided in the present disclosure, the process of synchronizing missing block data by the first service node does not affect the pulling of new block data by the first service node. After the first service node successfully synchronizes the missing block data from the target service node according to the block height in the missing block queue, the first service node may delete the block height of the synchronized missing block data from the missing block queue, to ensure that block heights added in the missing block queue are block heights of missing block data having not been pulled by the first service node.

Figure 4:
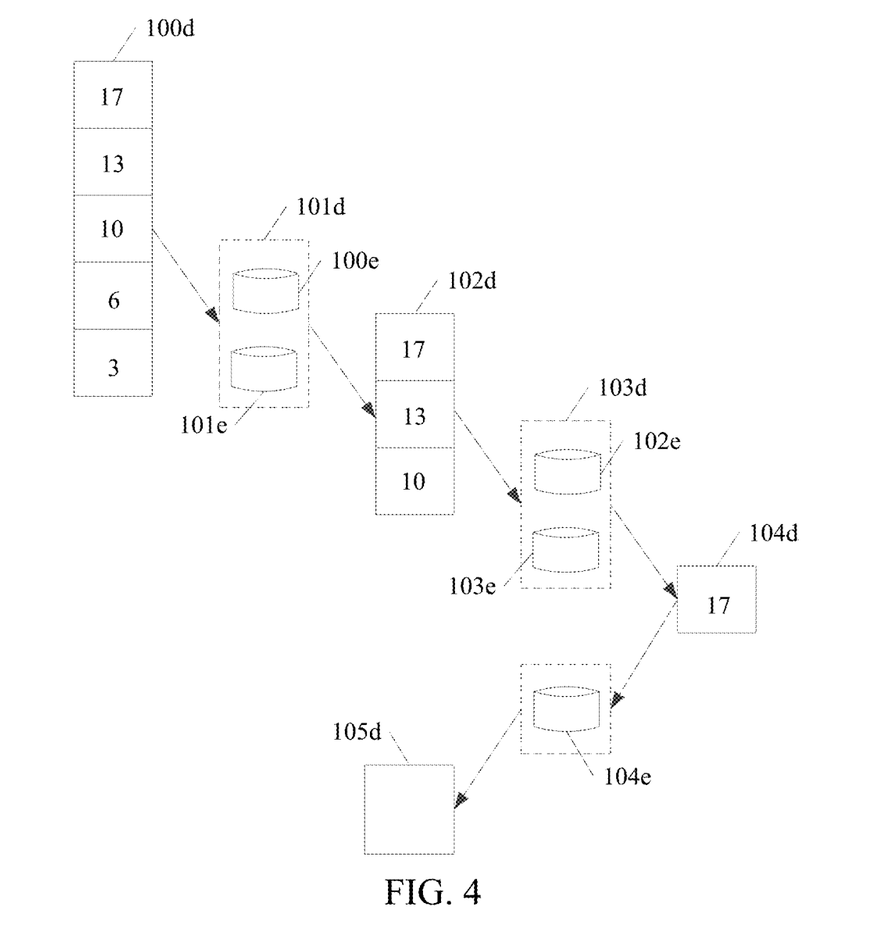
FIG. 4 is a schematic diagram of a queue change scenario according to an embodiment of the present disclosure.

Referring to FIG. 4, FIG. 4 is a schematic diagram of a queue change scenario according to an embodiment of the present disclosure. As shown in FIG. 4, at the first moment, a missing block queue 100d of the first service node includes a block height of 3, a block height of 6, a block height of 10, a block height of 13, and a block height of 17. Subsequently, after the first service node successfully pulls block data 101d (including block data 100e with a block height of 3 and block data 101e with a block height of 6), the first service node may delete the block height of 3 and the block height of 6 from the missing block queue 100d, to obtain a missing block queue 102d. Then, after the first service node successfully pulls block data 103d (including block data 102e with a block height of 10 and block data 103e with a block height of 13), the first service node may further delete the block height of 10 and the block height of 13 from the missing block queue 102d, to obtain a missing block queue 104d. Afterward, after successfully pulling block data 104e with a block height of 17, the first service node may delete the block height of 17 from the missing block queue 102d to obtain a missing block queue 105d. At this time, the missing block queue 105d is empty, indicating that all the missing block data has been successfully pulled. The missing block queue 100d, the missing block queue 102d, the missing block queue 104d, and the missing block queue 105d are queues of the same missing block queue of the first service node in different states at different time points.

Figure 5:
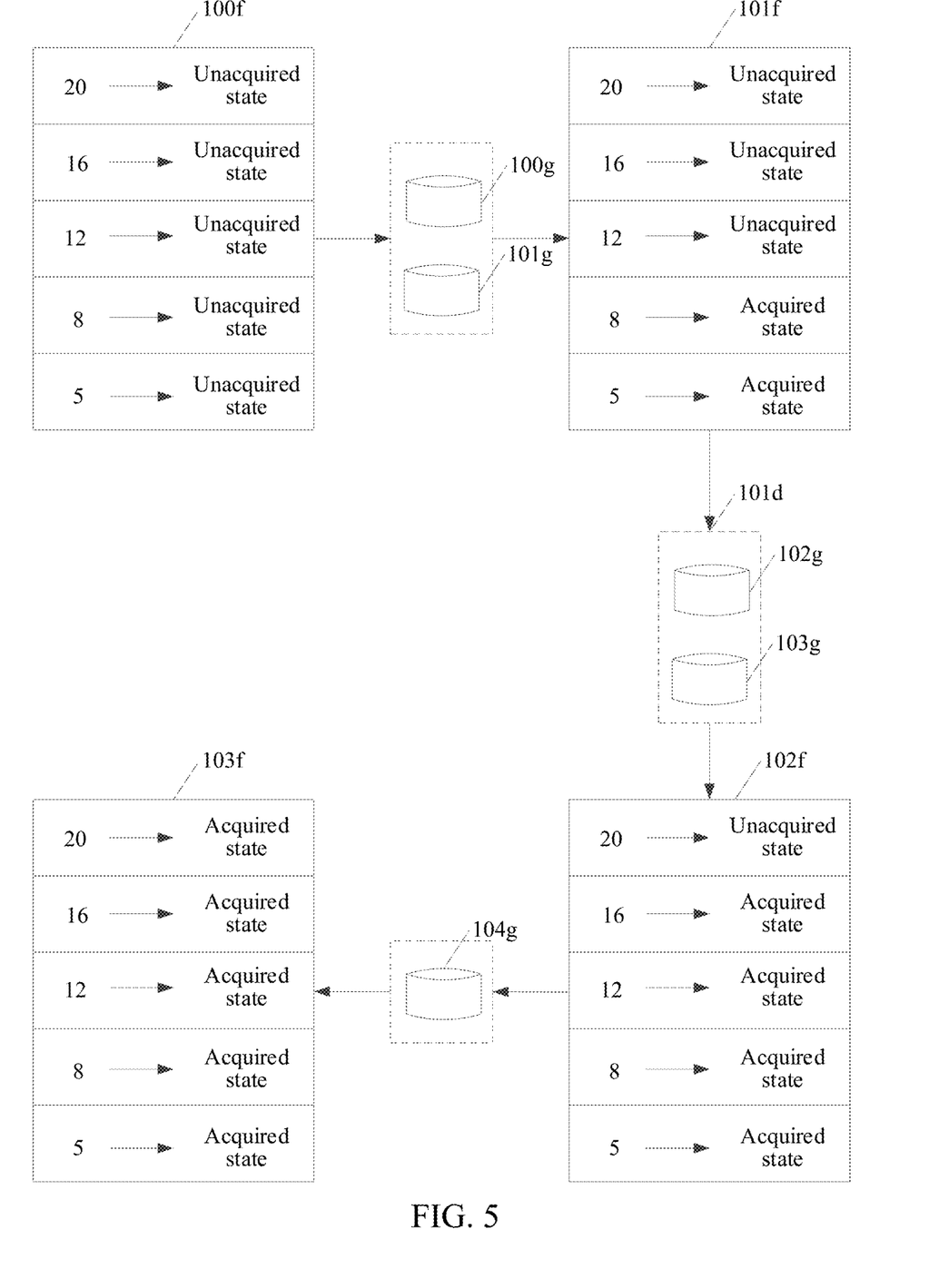
FIG. 5 is a schematic diagram of a queue change scenario according to an embodiment of the present disclosure.

In some embodiments, the first service node may not delete the block height of the synchronized missing block data from the missing block queue. In some cases, the first service node may add the block height of the missing block data to the missing block queue by setting an acquisition status of the block height of the missing block data to an unacquired state, and the first service node may add the block height with the unacquired state to the missing block queue. That is, each block height in the missing block queue carries an acquisition status, the acquisition status includes an unacquired state, and the unacquired state indicates that block data corresponding to the block height has not been acquired. The first service node may scan the missing block queue regularly according to a scanning period (for example, 1 hour or 1 day, etc.) for a block height set with the unacquired state, and may request the target service node to synchronize the missing block data according to the found block height carrying the unacquired state. After successfully synchronizing the missing block data from the target service node, the first service node may change the block height of the missing block data synchronized in the missing block queue from the unacquired state to an acquired state. The acquired state indicates that the missing block data of the corresponding block height has been synchronized. That is, the acquisition status (including the unacquired state and the acquired state) carried by the block height in the missing block queue may be used to indicate whether the corresponding missing block data has been successfully synchronized.

Referring to FIG. 5, FIG. 5 is a schematic diagram of a queue change scenario according to an embodiment of the present disclosure. As shown in FIG. 5, each block height in a missing block queue 100f of the first service node is added with an acquisition status. For example, in the missing block queue 100f, a block height of 5 is set with the unacquired state, a block height of 8 is set with the unacquired state, a block height of 12 is set with an unacquired state, a block height of 16 is set with an unacquired state, and a block height of 20 is set with an unacquired state. After the first service node successfully pulls block data 100g with a block height of 5 and block data 101g with a block height of 8, the first service node may change the block height of 5 and the block height of 8 in the missing block queue 100f from the unacquired state to the acquired state, to obtain a missing block queue 101f. Then, after the first service node further successfully pulls block data 102g with a block height of 12 and block data 103g with a block height of 16, the first service node may change the block height of 12 and the block height of 16 in the missing block queue 101f from the unacquired state to the acquired state, to obtain a missing block queue 102f. Afterward, after successfully pulling block data 104g with a block height of 20, the first service node may change the block height of 20 in the missing block queue 102f from the unacquired state to the acquired state, to obtain a missing block queue 103f. Up to this point, the acquisition status added to each block height in the missing block queue 103f is the acquired state, which indicates that the first service node has successfully pulled all the missing block data. The missing block queue 100f, the missing block queue 101f, the missing block queue 102f, and the missing block queue 103f are queues of the same missing block queue of the first service node in different states at different time points.

Figure 6:
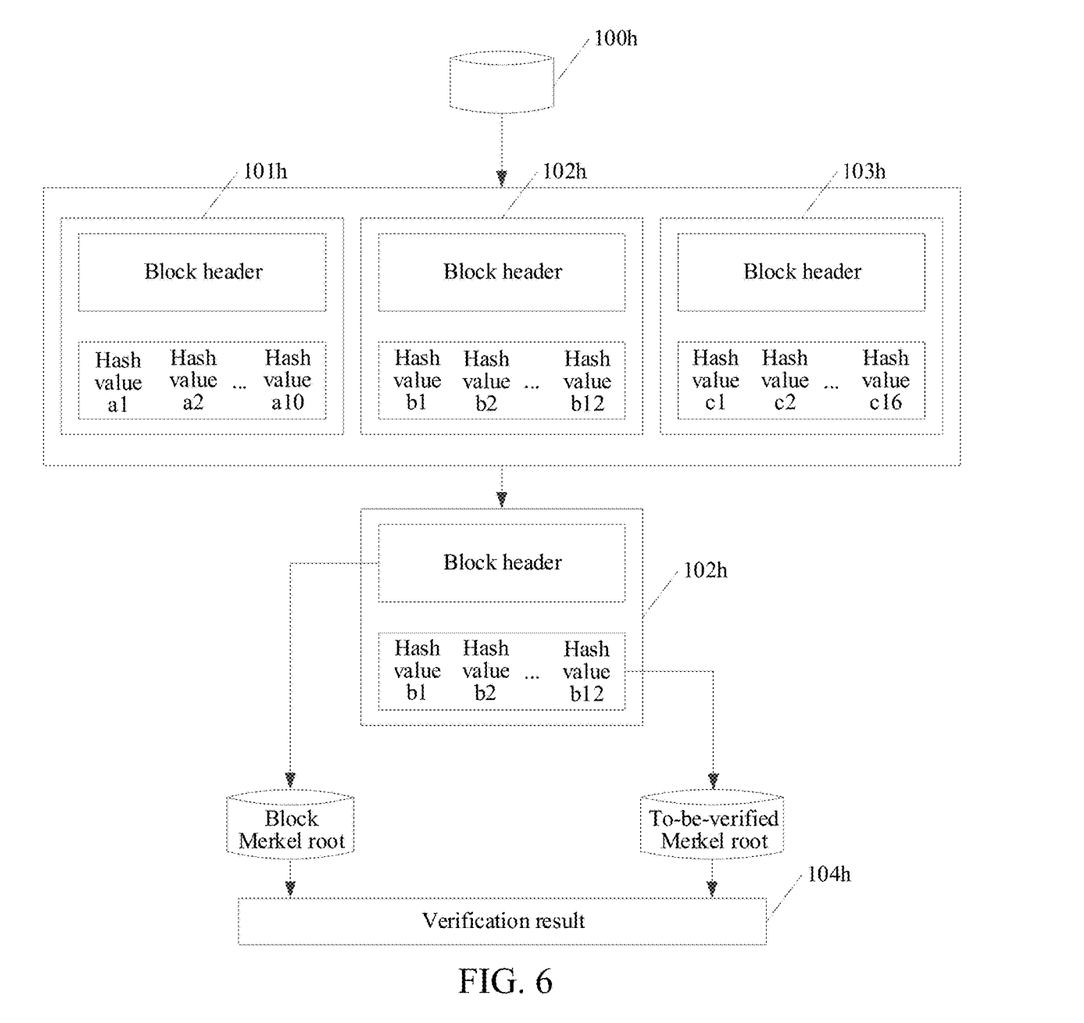
FIG. 6 is a schematic diagram of a data verification scenario according to an embodiment of the present disclosure.

The first service node may further verify service data to be verified according to the pulled block data, that is, verify whether the service data to be verified is authentic, i.e., whether the service data to be verified has been tampered with. One piece of block data corresponds to one block, and each piece of block data may include a block header in the corresponding block and hash values of service data in the corresponding block. Therefore, authentic service data (that is, service data that actually has not been tampered with) corresponding to the service data to be verified may be any piece of service data in a block corresponding to block data pulled by the first service node. The first service node may perform a hash operation on the service data to be verified to obtain a hash value of the service data to be verified. The first service node may traverse all previously pulled block data to search for block data including the hash value of the service data to be verified, where block data found by traversing may be referred to as block data to be verified. The service data to be verified may be verified may be verified according to the block data to be verified, to obtain a verification result. The verification results includes a valid verification result and an invalid verification result. The valid verification result indicates that the service data to be verified is authentic service data that has not been tampered with, and the invalid verification result indicates that the service data to be verified is not authentic service data. One embodiment for verifying the service data to be verified may be as follows: The first service node may acquire a block Merkel root from a block header in the block data to be verified, where the block Merkel root is a real Merkel root in a block corresponding to the block data to be verified. The first service node may further calculate a Merkel root to be verified according to hash values in the block data to be verified. The first service node may compare the acquired block Merkel root with the Merkel root to be verified. When it is determined through the comparison that the Merkel root to be verified is the same as the block Merkel root, the valid verification result is obtained; when it is determined through the comparison that the Merkel root to be verified is different from the block Merkel root, the invalid verification result is obtained.

Referring to FIG. 6, FIG. 6 is a schematic diagram of a data verification scenario according to an embodiment of the present disclosure. As shown in FIG. 6, block data acquired by the first service node may be traversed according to a hash value of service data to be verified 100$h$ to search for block data containing the hash value of the service data to be verified 100$h$. The block data acquired by the first service node includes block data 101$h$, block data 102$h$, and block data 103$h$. The block data 101$h$ includes a block header of a corresponding block and hash values of all transaction data in the corresponding block (including hash value a1, hash value a2, . . . , hash value a10). The block data 102$h$ includes a block header of a corresponding block and hash values of all transaction data in the corresponding block (including hash value b1, hash value b2, . . . , hash value b12). The block data 103$h$ includes a block header of a corresponding block and hash values of all transaction data in the corresponding block (including hash value c1, hash value c2, . . . , hash value c16). The found block data containing the hash value of the service data to be verified 100$h$ is the block data 102$h$. The first service node may acquire a block Merkel root from the block header of the block data 102$h$, and calculate a Merkel root to be verified according to the hash values in the block data 102$h$. The first service node may obtain a verification result 104$h$ by comparing the block Merkel root with the Merkel root to be verified, where the verification result 104$h$ includes a valid verification result and an invalid verification result. When it is determined through the comparison that the block Merkel root is the same as the Merkel root to be verified, the valid verification result is obtained. When the block Merkel root is different from the Merkel root to be verified, the invalid verification result is obtained.

In the present disclosure, during block data pulling, target block data may be acquired according to a first local block height, the first local block height being a maximum block height of local block data before the first service node acquires the target block data, and a minimum block height of the target block data being greater than the first local block height. If block data is missing during pulling, the minimum block height of the target block data and the first local block height will be discontinuous, rather than continuous. Therefore, a block height of missing block data may be determined according to a block height of the target block data and the first local block height, the block height of the missing block data being less than the minimum block height of the target block data and greater than the first local block height. Then, a target service node is requested to synchronize the missing block data according to the block height of the missing block data. It can be seen that the method proposed in the present disclosure can obtain the block height of the missing block data according to the block heights in the target block data and the first local block height and then can quickly synchronize the missing block data according to the block height of the missing block data, without needing to resynchronize all the block data, thereby improving the synchronization efficiency of missing block data.

Figure 7:
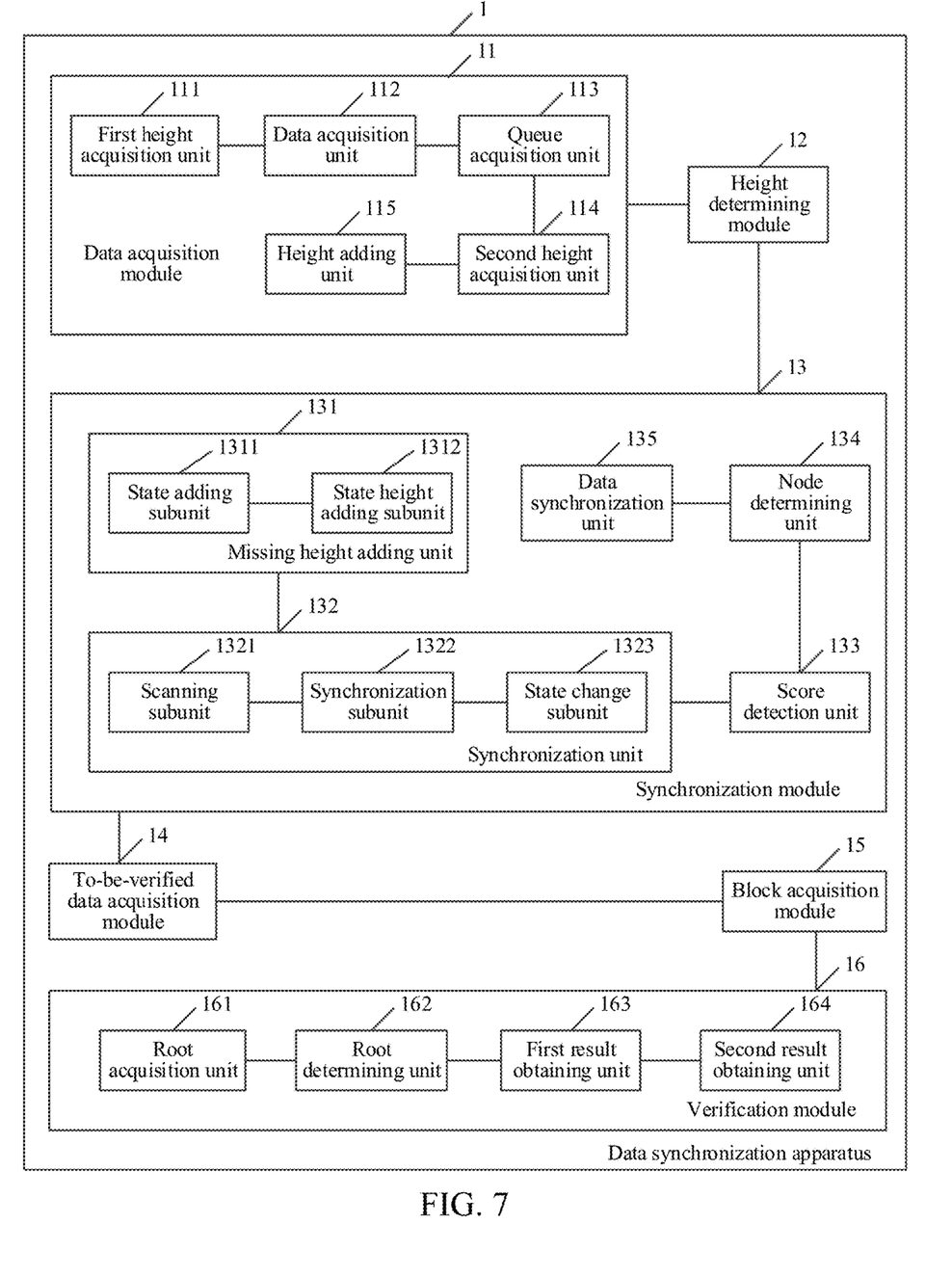
FIG. 7 is a schematic structural diagram of a blockchain-based data synchronization apparatus according to an embodiment of the present disclosure.

Referring to FIG. 7, FIG. 7 is a schematic structural diagram of a blockchain-based data synchronization apparatus according to an embodiment of the present disclosure. The blockchain-based data synchronization apparatus may be a computer program (including program code) running in a computer device. For example, the blockchain-based data synchronization apparatus is an application software. The apparatus may be configured to execute the corresponding steps in the method provided in the embodiments of the present disclosure. The data synchronization apparatus may also be applicable to a first service node. As shown in FIG. 7, the data synchronization apparatus 1 may include: a data acquisition module 11, a height determining module 12, and a synchronization module 13.

The data acquisition module 11 is configured to acquire target block data according to a first local block height, the first local block height being a maximum block height of local block data before the first service node acquires the target block data, and a minimum block height of the target block data being greater than the first local block height.

The height determining module 12 is configured to determine a block height of missing block data according to a block height of the target block data and the first local block height, the block height of the missing block data being less than the minimum block height of the target block data and greater than the first local block height.

The synchronization module 13 is configured to request a target service node to synchronize the missing block data according to the block height of the missing block data.

For implementations of specific functions of the data acquisition module 11, the height determining module 12, and the synchronization module 13, reference may be made to step S101 to step S103 in the embodiment corresponding to FIG. 3, which will not be repeated here.

In some embodiments, the data acquisition module 11 includes: a first height acquisition unit 111 and a data acquisition unit 112.

The first height acquisition unit 111 is configured to acquire a second local block height broadcast by a second service node, the second local block height being broadcast by the second service node to the first service node according to a broadcast period; and The data acquisition unit 112 is configured to acquire the target block data according to the first local block height and the second local block height in response to detecting that the second local block height is greater than the first local block height.

For implementations of specific functions of the first height acquisition unit 111 and the data acquisition unit 112, reference may be made to step S101 in the embodiment corresponding to FIG. 3, which will not be repeated here.

In some embodiments, the data synchronization apparatus 1 is further configured to:

broadcast the first local block height to the second service node according to a broadcast period, so that in response to detecting that the first local block height is greater than the second local block height, the second service node pulls block data from a third service node according to the first local block height and the second local block height, the third service node being a service node with a highest service quality score in a service node cluster.

In some embodiments, the data acquisition module 11 includes: a queue acquisition unit 113 and a second height acquisition unit 114.

The queue acquisition unit 113 is configured to acquire a maximum block height queue, the maximum block height queue including maximum block heights in block data pulled by the first service node in block data pulling operations.

The second height acquisition unit 114 is configured to acquire a block height with a largest value from the maximum block height queue as the first local block height.

In some embodiments, the apparatus further includes a height adding unit 115.

The height adding unit 115 is configured to add a maximum block height among block heights carried in the target block data to the maximum block height queue.

Because the height addition unit 115 may obtain the maximum block height queue, it may be considered that the data acquisition module 11 of the apparatus includes the height addition unit 115 to obtain the maximum block height queue, so that the queue acquisition unit 113 in the data acquisition module 11 can acquire the maximum block height queue.

For implementations of specific functions of the queue acquisition unit 113, the second height acquisition unit 114, and the height addition unit 115, reference may be made to step S101 in the embodiment corresponding to FIG. 3, which will not be repeated here.

In some embodiments, the synchronization module 13 includes: a missing height adding unit 131 and a synchronization unit 132.

The missing height adding unit 131 is configured to add the block height of the missing block data to a missing block queue.

The synchronization unit 132 is configured to request the target service node to synchronize the missing block data according to the missing block queue.

For implementations of specific functions of the missing height adding unit 131 and the synchronization unit 132, reference may be made to step S103 in the embodiment corresponding to FIG. 3, which will not be repeated here.

In some embodiments, the data synchronization apparatus 1 is further configured to:

delete the block height of the missing block data from the missing block queue after the missing block data is successfully synchronized from the target service node according to the missing block queue.

In some embodiments, each block height in the missing block queue carries an acquisition status, the acquisition status includes an unacquired state, and the missing height adding unit 131 includes: a state adding subunit 1311 and a state height adding subunit 1312.

The state adding subunit 1311 is configured to set the acquisition status of the block height of the missing block data to the unacquired state.

The state height adding subunit 1312 is configured to add the block height with the unacquired state to the missing block queue.

For implementations of specific functions of the state adding subunit 1311 and the state height adding subunit 1312, reference may be made to step S103 in the embodiment corresponding to FIG. 3, which will not be repeated here.

In some embodiments, the acquisition status further includes an acquired state, and the synchronization unit 132 includes: a scanning subunit 1321, a synchronization subunit 1322, and a state change subunit 1323.

The scanning subunit 1321 is configured to scan the missing block queue for a block height carrying the unacquired state according to a scanning period.

The synchronization subunit 1322 is configured to request the target service node to synchronize the missing block data according to the found block height carrying the unacquired state; and The state change subunit 1323 is configured to change the unacquired state of the block height of the missing block data in the missing block queue to the acquired state when the missing block data has been successfully synchronized from the target service node.

For implementations of specific functions of the scanning subunit 1321, the synchronization subunit 1322, and the state change subunit 1323, reference may be made to step S103 in the embodiment corresponding to FIG. 3, which will not be repeated here.

In some embodiments, the synchronization module 13 includes: a score detection unit 133, a node determining unit 134, and a data synchronization unit 135.

The score detection unit 133 is configured to detect a service quality score of each service node in the service node cluster, the service quality score of each service node being determined based on an amount of block data acquired by the each service node in a unit time.

The node determining unit 134 is configured to determine the service node with a highest service quality score in the service node cluster as the target service node.

The data synchronization unit 135 is configured to request the target service node to synchronize the missing block data according to the block height of the missing block data.

For implementations of specific functions of the score detection unit 133, the node determining unit 134, and the data synchronization unit 135, reference may be made to step S103 in the embodiment corresponding to FIG. 3, which will not be repeated here.

In some embodiments, one piece of block data corresponds to one block, each piece of block data acquired by the first service node includes a block header in the corresponding block and hash values of service data in the corresponding block, and the data synchronization apparatus 1 further includes: a to-be-verified data acquisition module 14, a block acquisition module 15, and a verification module 16.

The to-be-verified data acquisition module 14 is configured to acquire service data to be verified and a hash value of the service data to be verified.

The block acquisition module 15 is configured to acquire block data including the hash value of the service data to be verified from the acquired block data as block data to be verified.

The verification module 16 is configured to verify the service data to be verified according to a block header in the block data to be verified and hash values in the block data to be verified, to obtain a verification result, the verification results including a valid verification result and an invalid verification result.

For implementations of specific functions of the to-be-verified data acquisition module 14, the block acquisition module 15, and the verification module 16, reference may be made to step S103 in the embodiment corresponding to FIG. 3, which will not be repeated here.

In some embodiments, the verification module 16 includes: a root acquisition unit 161, a root determining unit 162, a first result obtaining unit 163, and a second result obtaining unit 164.

The root acquisition unit 161 is configured to acquire a block Merkel root from the block header in the block data to be verified.

The root determining unit 162 is configured to determine a Merkel root to be verified according to the hash values in the block data to be verified.

The first result obtaining unit 163 is configured to obtain the valid verification result when the block Merkel root is the same as the Merkel root to be verified.

The second result obtaining unit 164 is configured to obtain the invalid verification result when the block Merkel root is different from the Merkel root to be verified.

For implementations of specific functions of the root acquisition unit 161, the root determining unit 162, the first result obtaining unit 163, and the second result obtaining unit 164, reference may be made to step S103 in the embodiment corresponding to FIG. 3, which will not be repeated here.

In the present disclosure, during block data pulling, target block data may be acquired according to a first local block height, the first local block height being a maximum block height of local block data before the first service node acquires the target block data, and a minimum block height of the target block data being greater than the first local block height. If block data is missing during pulling, the minimum block height of the target block data and the first local block height will be discontinuous, rather than continuous. Therefore, a block height of missing block data may be determined according to a block height of the target block data and the first local block height, the block height of the missing block data being less than the minimum block height of the target block data and greater than the first local block height. Then, a target service node is requested to synchronize the missing block data according to the block height of the missing block data. It can be seen that the method proposed in the present disclosure can obtain the block height of the missing block data according to the block heights in the target block data and the first local block height and then can quickly synchronize the missing block data according to the block height of the missing block data, without needing to resynchronize all the block data, thereby improving the synchronization efficiency of missing block data.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 8:
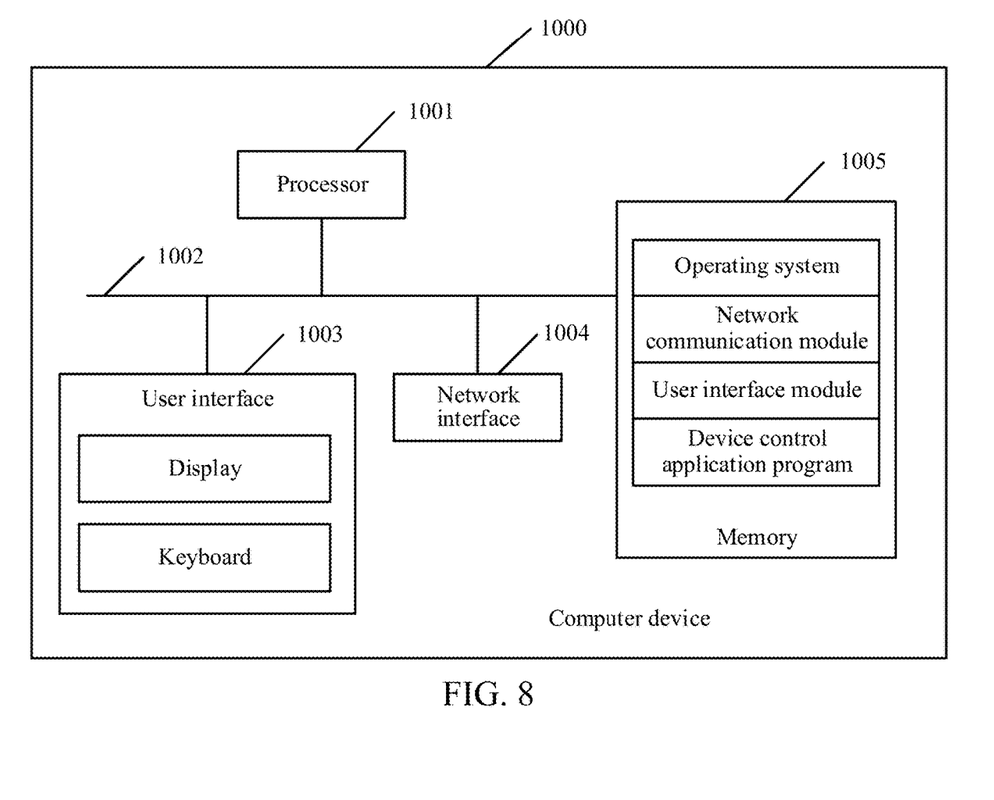
FIG. 8 is a schematic structural diagram of a computer device according to an embodiment of the present disclosure.

Referring to FIG. 8, FIG. 8 is a schematic structural diagram of a computer device according to an embodiment of the present disclosure. As shown in FIG. 8, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between these components. The user interface 1003 may include a display and a keyboard. In some embodiments, the user interface 1003 may further include a standard wired interface and a wireless interface. In some embodiments, the network interface 1004 may include a standard wired interface and a standard wireless interface (for example, a Wi-Fi interface). The memory 1005 may be a high-speed RAM, or may be a non-volatile memory, for example, at least one magnetic disk memory. In some embodiments, the memory 1005 may alternatively be at least one storage apparatus located away from the processor 1001. As shown in FIG. 8, the memory 1005 used as a computer storage medium may include an operating system, a network communication module, a user interface module, and a device control application program.

In the computer device 1000 shown in FIG. 8, the network interface 1004 may provide a network communication function, the user interface 1003 is mainly configured to provide an input interface for a user, and the processor 1001 may be configured to invoke the device control application program stored in the memory 1005, to implement the description of the blockchain-based data synchronization method provided in the foregoing embodiment. It is to be understood that the computer device 1000 described in the present disclosure may also implement the descriptions of the blockchain-based data synchronization apparatus 1 in the foregoing embodiment corresponding to FIG. 7. Details are not described herein again. In addition, beneficial effects achieved by using the same method are not described herein again.

In addition, it is to be noted that: the present disclosure further provides a computer-readable storage medium. The computer-readable storage medium stores a computer program executed by the blockchain-based data synchronization apparatus 1 mentioned above, and the computer program includes program instructions. When executing the program instructions, the processor can implement the descriptions of the blockchain-based data synchronization method in the foregoing embodiment corresponding to FIG. 3. Therefore, details are not described herein again. In addition, beneficial effects achieved by using the same method are not described herein again. For technical details that are not disclosed in the embodiment of the computer storage medium of the present disclosure, refer to the descriptions of the method embodiments of the present disclosure.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A blockchain-based data synchronization method, executed by a first service node, the method comprising:
   acquiring target block data of a target block having a minimum block height that is greater than a first local block height, wherein the first local block height is a maximum block height of local block data of the first service node before the first service node acquires the target block data, the target block being one of a plurality of blocks in a blockchain system, the plurality of blocks including information about one or more network transactions for verifying information validity and for generating a next block;

adding a maximum block height among block heights carried in the target block data to the maximum block height queue, the maximum block height queue comprising maximum block heights of block data pulled by the first service node in block data pulling operations;

determining a block height of missing block data according to a block height of the target block data and the first local block height, the block height of the missing block data being less than the minimum block height of the target block data and greater than the first local block height;

adding the block height of the missing block data to a missing block queue; and requesting a target service node to synchronize the missing block data according to the block height of the missing block data in the missing block queue.

2. The method according to claim 1, wherein the acquiring target block data according to a first local block height comprises:

acquiring a second local block height broadcast by a second service node, the second local block height being broadcast by the second service node to the first service node according to a broadcast period; and acquiring the target block data according to the first local block height and the second local block height in response to detecting that the second local block height is greater than the first local block height.

3. The method according to claim 2, further comprising: broadcasting the first local block height to the second service node according to the broadcast period, so that in response to detecting that the first local block height is greater than the second local block height, the second service node pulls block data from a third service node according to the first local block height and the second local block height, the third service node being a service node with a highest service quality score in a service node cluster, the service node cluster including the first service node and the second service node.

4. The method according to claim 1, wherein acquiring the first local block height comprises:

acquiring a block height with a largest value from the maximum block height queue as the first local block height.

5. The method according to claim 1, further comprising: deleting the block height of the missing block data from the missing block queue after the missing block data is successfully synchronized from the target service node according to the missing block queue.

6. The method according to claim 1, wherein each block height in the missing block queue carries an acquisition status, the acquisition status comprises an unacquired state, and the adding the block height of the missing block data to a missing block queue comprises:

setting the acquisition status of the block height of the missing block data to the unacquired state; and adding the block height with the unacquired state to the missing block queue.

7. The method according to claim 6, wherein the acquisition status further comprises an acquired state, and the requesting the target service node to synchronize the missing block data according to the missing block queue comprises:

scanning the missing block queue for a block height carrying the unacquired state according to a scanning period;

requesting the target service node to synchronize the missing block data according to the found block height carrying the unacquired state; and changing the unacquired state of the block height of the missing block data in the missing block queue to the acquired state when the missing block data has been successfully synchronized from the target service node.

8. The method according to claim 1, wherein the requesting a target service node to synchronize the missing block data according to the block height of the missing block data comprises:

detecting a service quality score of each service node in a service node cluster, the service quality score of the each service node being determined based on an amount of block data acquired by the each service node in a unit time;

determining a service node with a highest service quality score in the service node cluster as the target service node; and requesting the target service node to synchronize the missing block data according to the block height of the missing block data.

9. The method according to claim 1, wherein one piece of block data corresponds to one block, each piece of block data acquired by the first service node comprises a block header in the corresponding block and hash values of service data in the corresponding block, and the method further comprises:

acquiring service data to be verified and a hash value of the service data to be verified;

acquiring block data comprising the hash value of the service data to be verified from the acquired block data as block data to be verified; and verifying the service data to be verified according to a block header in the block data to be verified and hash values in the block data to be verified, to obtain a verification result, the verification result being a valid verification result or an invalid verification result.

10. The method according to claim 9, wherein the verifying the service data to be verified according to a block header in the block data to be verified and hash values in the block data to be verified, to obtain a verification result comprises:

acquiring a block Merkel root from the block header in the block data to be verified;

determining a Merkel root to be verified according to the hash values in the block data to be verified;

obtaining the valid verification result when the block Merkel root is the same as the Merkel root to be verified; and obtaining the invalid verification result when the block Merkel root is different from the Merkel root to be verified.

11. The method according to claim 1, wherein the block data pulling operations to update the maximum block height queue are not affected by the requesting of the target service node to synchronize the missing block data according to the missing block queue.

12. A computer device of a first service node in a blockchain, comprising:

at least one memory; and at least one processor coupled to the at least one memory and being configured to perform:

acquiring target block data of a target block having a minimum block height that is greater than a first local block height, wherein the first local block height is a maximum block height of local block data of the first service node before the first service node acquires the target block data, the target block being one of a plurality of blocks in a blockchain system, the plurality of blocks including information about one or more network transactions for verifying information validity and for generating a next block;

adding a maximum block height among block heights carried in the target block data to the maximum block height queue, the maximum block height queue comprising maximum block heights of block data pulled by the first service node in block data pulling operations;

determining a block height of missing block data according to a block height of the target block data and the first local block height, the block height of the missing block data being less than the minimum block height of the target block data and greater than the first local block height;

adding the block height of the missing block data to a missing block queue; and requesting a target service node to synchronize the missing block data according to the block height of the missing block data in the missing block queue.

13. The device according to claim 12, wherein the acquiring target block data according to a first local block height comprises:
acquiring a second local block height broadcast by a second service node, the second local block height being broadcast by the second service node to the first service node according to a broadcast period; and
acquiring the target block data according to the first local block height and the second local block height in response to detecting that the second local block height is greater than the first local block height.

14. The device according to claim 13, wherein the at least one processor is further configured to perform:
broadcasting the first local block height to the second service node according to the broadcast period, so that in response to detecting that the first local block height is greater than the second local block height, the second service node pulls block data from a third service node according to the first local block height and the second local block height, the third service node being a service node with a highest service quality score in a service node cluster, the service node cluster including the first service node and the second service node.

15. The device according to claim 12, wherein acquiring the first local block height comprises:
acquiring a block height with a largest value from the maximum block height queue as the first local block height.

16. The device according to claim 12, wherein the at least one processor is further configured to perform:
deleting the block height of the missing block data from the missing block queue after the missing block data is successfully synchronized from the target service node according to the missing block queue.

17. The device according to claim 12, wherein each block height in the missing block queue carries an acquisition status, the acquisition status comprises an unacquired state, and the adding the block height of the missing block data to a missing block queue comprises:
setting the acquisition status of the block height of the missing block data to the unacquired state; and
adding the block height with the unacquired state to the missing block queue.

18. The device according to claim 17, wherein the acquisition status further comprises an acquired state, and the requesting the target service node to synchronize the missing block data according to the missing block queue comprises:
scanning the missing block queue for a block height carrying the unacquired state according to a scanning period;
requesting the target service node to synchronize the missing block data according to the found block height carrying the unacquired state; and
changing the unacquired state of the block height of the missing block data in the missing block queue to the acquired state when the missing block data has been successfully synchronized from the target service node.

19. The device according to claim 12, wherein the requesting a target service node to synchronize the missing block data according to the block height of the missing block data comprises:
detecting a service quality score of each service node in a service node cluster, the service quality score of the each service node being determined based on an amount of block data acquired by the each service node in a unit time;
determining a service node with a highest service quality score in the service node cluster as the target service node; and
requesting the target service node to synchronize the missing block data according to the block height of the missing block data.

20. A non-transitory computer-readable storage medium, storing a computer program, the computer program comprising program instructions, the program instructions, when executed by at least one processor of a first service node in a blockchain, cause the at least one processor to perform:
acquiring target block data of a target block having a minimum block height that is greater than a first local block height, wherein the first local block height is a maximum block height of local block data of the first service node before the first service node acquires the target block data, the target block being one of a plurality of blocks in a blockchain system, the plurality of blocks including information about one or more network transactions for verifying information validity and for generating a next block;
adding a maximum block height among block heights carried in the target block data to the maximum block height queue, the maximum block height queue comprising maximum block heights of block data pulled by the first service node in block data pulling operations;
determining a block height of missing block data according to a block height of the target block data and the first local block height, the block height of the missing block data being less than the minimum block height of the target block data and greater than the first local block height;
adding the block height of the missing block data to a missing block queue; and
requesting a target service node to synchronize the missing block data according to the block height of the missing block data in the missing block queue.

* * * * *